United States Patent

Laval

[15] 3,691,793
[45] Sept. 19, 1972

[54] PLANT FOR RECOVERING ENERGY FROM EXHAUST GASES FROM A BACK-PRESSURE BLAST FURNACE

[72] Inventor: Paul Marie Georges Laval, Liege, Belgium

[73] Assignee: Cockerill-Origree-Providence et Esperance-loirgdoz in Obrege "Cockerill," Seraing Lez Liege, Belgium

[22] Filed: Dec. 14, 1970

[21] Appl. No.: 97,498

[30] Foreign Application Priority Data

Dec. 19, 1969 Belgium..........42,577

[52] U.S. Cl..........................60/39.5
[51] Int. Cl............................F02c 7/02
[58] Field of Search..........60/39.18 R, 39.18 B, 39.5

[56] References Cited

UNITED STATES PATENTS

| | | | |
|---|---|---|---|
| 2,714,670 | 8/1955 | Linder et al. | 60/39.5 |
| 3,234,735 | 2/1966 | Pirsh et al. | 60/39.18 R |
| 2,592,749 | 4/1952 | Sedille et al. | 60/39.18 R |

FOREIGN PATENTS OR APPLICATIONS

| | | | |
|---|---|---|---|
| 601,999 | 7/1960 | Canada | 60/39.18 B |
| 675,583 | 7/1952 | Great Britain | 60/39.18 B |

Primary Examiner—Carlton R. Croyle
Assistant Examiner—Warren Olsen
Attorney—Young & Thompson

[57] ABSTRACT

In a plant for recovering the energy of exhaust gases of a back-pressure blast-furnace there is provided a main conduit with a dust collector leaving a minimum of dust of about 4 g/m³ in said gases which are lead in a part of 85 to 90 percent by volume directly to an expansion turbine by a by-pass conduit on which is mounted a cleaner and leaving said main conduit after said dust collector and running again into said main conduit after a washer-dust precipitator and a control valve on said main conduit leading to the utilization place of said gases.

1 Claim, 1 Drawing Figure

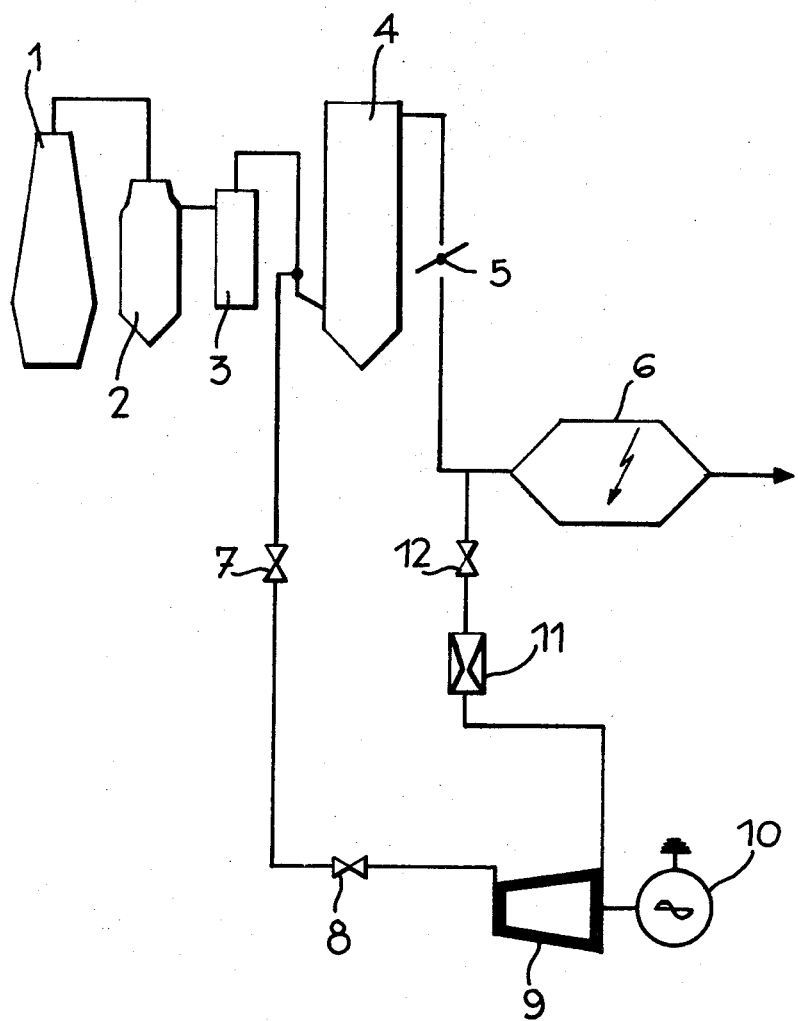

PLANT FOR RECOVERING ENERGY FROM EXHAUST GASES FROM A BACK-PRESSURE BLAST FURNACE

This invention relates to a plant for recovering the energy of the exhaust gases leaving the throat of a back-pressure blast-furnace.

In metallurgy, the production of cast-iron is effected by treating a charge comprising iron ores and a combustible in blast-furnaces some of which operate with a back-pressure. It is known that in a blast-furnace of said kind, the exhaust gases leaving the throat are at an effective pressure which is now from about 1.5 to 2 kg/cm$^2$ but which may exceed the latter value, and their temperature is far above 100°C. These gases at high pressure and high temperature are then often used as a combustible. For this purpose these gases need to previously undergo a strong dust removal that is a dust removal such that the gases contain about 0.005 g/m$^3$ of residual dust, which is accompanied by expansion and cooling. However, their energy due to high pressure and high temperature is unfortunately lost.

On the other hand, it has been found that said energy of the gases is far from being negligible and can be recovered.

Therefore, plants have already been proposed wherein after a strong dust removal of the above mentioned kind, the exhaust gases of a back-pressure blast-furnace undergo expansion in a turbine. Until now, said strong dust removal executed prior to expansion, was quite necessary for avoiding wear of the blades of the turbine as a result of the abrasion caused by dust particles, and also for avoiding fouling of the turbine.

The presently known plants for recovering energy operate with very clean gases and possibly with multistage turbines. Their performances are however low, due, among others, to the need of eliminating dust completely.

The result of abrasion and fouling due to dust particles is such that dust has until now been considered as preventing from using gases of back-pressure blast-furnaces directly in a turbine in order to recover the energy of said gases.

It is an object of the invention to provide a plant which will allow to recover the energy of exhaust gases of back-pressure blast-furnaces without necessitating a strong dust removal of the above mentioned kind, while, at the same time, eliminating abrasion.

Another object of the invention consists in a plant for recovering the energy of exhaust gases of a back-pressure blast-furnace by means of an expansion turbine placed or inserted in a by-pass conduit by-passing the main conduit which leads the gases to the place where they are used, said plant being characterized in that said main conduit has at least one dust collector for big particles with little pressure drop, so as to maintain the pressure of the gas at a substantially constant level, whereby said gases also must remain loaded with a minimum amount of dust of about 4 g/m$^3$, said main conduit having after said dust collector an inlet for said by-pass conduit, on which said expansion turbine is mounted, said turbine being fed immediately by the gases from said main conduit, said turbine being also followed by a cleaner which lowers the content of dusts in the gases to about 0.1 g/m$^3$, said by-pass conduit running into the main conduit after a washer dust precipitator and after a control valve for the conduit leading to the place where the gases are to be used.

An essential advantage of such a plant results from a surprising fact, contrary to until now prevalent opinion: there is no accumulation of dust particles neither on the stationary blades nor on the movable blades, nor in any other place of the turbine. In view of this self-cleaning, the maintenance is thus reduced to a minimum. Furthermore, since it is not necessary to effect a previous strong dust removal of the above mentioned kind the performance of the plant is higher than that of the known plants.

Another appreciable advantage, is due to the fact that said dust precipitator forms a true reservoir of mixing and homogenization for said gases and that its presence at that place of the plant has almost no effect on pressure, while its effect on temperature is also very weak. In other words, after said element, the pressure of gases is almost unchanged starting from the outlet of the blast-furnace, and the temperature is slightly reduced.

Other particular features and advantages may appear from the following description of the accompanying drawing which diagrammatically shows, an embodiment of a plant according to this invention.

The drawing shows schematically a recovery plant according to the invention.

In the drawing, only those parts which are useful for the understanding of the invention are shown, the other parts having been voluntarily omitted.

As shown, the gases from a back-pressure blast furnace 1 are conducted by a main conduit to a dust collector comprising a dust catcher 2 and a cyclone separator 3, and are then conducted to a washer-dust precipitator 4 before reaching a valve 5 which controls via an electro-filter 6, the entrance into a low-pressure conduit leading to a place for using gases at low pressure. After the cyclone separator 3 of the dust collector, the main conduit has up-stream the washer-dust precipitator 4, a by-pass conduit leading directly to an expansion turbine 9 which is thus immediately fed with gases loaded with dust particles; said gases are supplied according to a volume which is comprised between 85 to 95 percent by volume of the exhaust gases leaving the throat of the blast-furnace.

In the dust catcher 2, the gases undergo substantially no drop of pressure and their temperature does substantially not vary. After the cyclone separator 3, the gases fed to the turbine must still have a dust content from about 4 to 5 g/m$^3$. Said dust content is necessary to ensure self-cleaning of the turbine 9. The by-pass conduit has a control valve 8 mounted thereon. The expanded gases coming from the turbine 9 pass then into a cleaner 11 having a small pressure drop, before being brought back to the low pressure conduit up-stream the electro-filter 6 and before being conducted to the place where they are to be used. The turbine 9 drives an electric generator 10, or instead of the latter, a turbo-compressor.

The turbine may be isolated from the circuit of the main conduit at low pressure by shut off valves 7 and 12.

The turbine used is a single stage turbine when the ratio of pressures up-stream and down-stream is below about 3 whereas there is used a multistage turbine when the ratio of said pressures is above 3.

A plant according to this invention is very advantageous because it is simple and recovers at a maximum the energy of the gases under economical conditions. As a matter of fact before the turbine, the plant does not necessitate any dust-removing device which would reduce the dust content to less than 1 g/m³, contrary to the known plants which use such a dust-removing device, which necessitates important dust-removing means, which are bulky and expensive.

In addition, the yield of the plant is high because the generator produces about 234 kilowatts-hour per 10,000 m³ of gas when 2effective pressure at the exit of the throat of the back-pressure blast-furnace amounts to about 1 kg/cm².

Furthermore, it should be noted that surprisingly the plant undergoes no quick wear. Indeed, after having operated for 5,000 hours a test plant showed a perfect keeping of all its component parts. It is also very surprising that all the stationary and movable blades of the turbine remained perfectly clean.

What we claim is:

1. A plant for recovering the energy of exhaust gases from a back-pressure blast furnace, comprising a main conduit leading said gases to the place where they are utilized, a dust collector for big particles having a small pressure drop so as to maintain the pressure of the gases at a substantially constant level, whereby said gases also must remain loaded with a minimum amount of dust of about 4 g/m³, a washer-dust precipitator connected to said main conduit for receiving gases from said dust collector, a control valve mounted on said main conduit downstream of said washer-dust precipitator, an electro-filter mounted on said main conduit after said control-valve, a by-pass conduit leading from an inlet located in said main conduit between said dust collector and said washer-dust precipitator to an outlet located in said main conduit between said control-valve and said electro-filter, an expansion turbine mounted on said by-pass conduit and directly supplied with a part of the loaded gases which expand in said turbine, said part of the loaded gases passing through said by-pass conduit and said turbine being comprised between 85 to 90 percent by volume of the exhaust gases of said blast-furnace, a cleaner downstream of said turbine for lowering the dust content of the gases coming out from said turbine to about 0.1 g/m³, said main conduit leading the gases from said electro-filter to the place where they are to be utilized.

* * * * *